(12) United States Patent
Jywe et al.

(10) Patent No.: US 12,442,694 B2
(45) Date of Patent: Oct. 14, 2025

(54) DRIVE SYSTEM THERMAL TEMPERATURE RISE TEST AND COMPENSATION SYSTEM

(71) Applicant: National Taiwan University, Taipei (TW)

(72) Inventors: Wen-Yuh Jywe, Yunlin County (TW); Tung-Hsien Hsieh, Yunlin County (TW); Chia-Ming Hsu, Changhua (TW); Yu-Wei Chang, Taichung (TW); Sen-Yi Huang, Yunlin County (TW); Ching-Ying Chiu, Chiayi County (TW); Pin-Wei Lu, Hualien County (TW); Jheng-Jhong Zeng, Hsinchu (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 551 days.

(21) Appl. No.: 17/933,361

(22) Filed: Sep. 19, 2022

(65) Prior Publication Data

US 2024/0027281 A1  Jan. 25, 2024

(30) Foreign Application Priority Data

Jul. 21, 2022 (TW) .................................. 111127422

(51) Int. Cl.
  *G01K 3/10* (2006.01)
  *B23Q 17/22* (2006.01)
  (Continued)

(52) U.S. Cl.
  CPC ........... *G01K 3/10* (2013.01); *B23Q 17/2233* (2013.01); *B23Q 17/24* (2013.01);
  (Continued)

(58) Field of Classification Search
  CPC .... B23J 17/24; B23J 17/2233; B23J 17/2426; B23J 17/2466; B23J 2230/002;
  (Continued)

(56) References Cited

U.S. PATENT DOCUMENTS 2,956,344 A * 10/1960 Rantsch ............. B23Q 11/0003
  33/791
7,852,478 B1 * 12/2010 Jywe ....................... B23Q 17/24
  356/400

(Continued)

FOREIGN PATENT DOCUMENTS

CN  1853084 A  10/2006
TW  I754562 B   2/2022

(Continued)

*Primary Examiner* — Randy W Gibson
(74) *Attorney, Agent, or Firm* — Sinorica International Patent & Trademark

(57) ABSTRACT

A drive system thermal temperature rise test and compensation system. The system has an optical non-contact type sensing head mounted on a main shaft of a machine tool, and a sensing center is formed in the center of the sensing head. A platform driven by a transmission device of the machine tool is provided with plural ball lens devices, and a temperature sensor for transmitting temperature data externally is further provided on the transmission device. After the machine tool sequentially records an original point coordinate for each ball lens center by using the sensing head, the sensing head is cyclically and sequentially moved to the original point coordinate of each ball lens, so as to measure a displacement error between the sensing center and the ball lens center resulted from thermal shifts of the transmission device, as well as capable of measuring multiaxial errors and using various axial temperatures for compensation.

7 Claims, 9 Drawing Sheets

(51) Int. Cl.
  *B23Q 17/24*  (2006.01)
  *G01B 11/00*  (2006.01)
  *G01B 11/03*  (2006.01)
(52) U.S. Cl.
  CPC ........ *B23Q 17/2461* (2013.01); *G01B 11/005* (2013.01); *G01B 11/03* (2013.01)
(58) Field of Classification Search
  CPC ..... G01B 11/024; G01B 11/03; G01B 11/005; G01K 3/10
  See application file for complete search history.

(56) References Cited

U.S. PATENT DOCUMENTS

| | | | |
|---|---|---|---|
| 9,267,784 B2* | 2/2016 | Atwell | G01B 11/03 |
| 2009/0051933 A1* | 2/2009 | Stimpson | B23Q 17/2233 |
| | | | 356/614 |
| 2013/0286196 A1* | 10/2013 | Atwell | G01C 11/02 |
| | | | 348/136 |
| 2023/0135905 A1* | 5/2023 | Röders | G05B 19/404 |
| | | | 700/193 |

FOREIGN PATENT DOCUMENTS

| | | |
|---|---|---|
| TW | 1754563 B | 2/2022 |
| WO | 2007/096585 A1 | 8/2007 |

* cited by examiner

DRIVE SYSTEM THERMAL TEMPERATURE RISE TEST AND COMPENSATION SYSTEM

BACKGROUND OF THE INVENTION a) Field of the Invention

The present invention relates to a machine tool compensation means, more particularly to a drive system thermal temperature rise test and compensation system.

b) Description of the Prior Art

During processing, various linear shafts and rotary shafts of the transmission device of the current machine tools perform continuous reciprocating motions, and thermal deformations resulted from temperature rises occur in transmission parts in the shafts of the transmission device under the influences of friction forces and environmental temperature, leading to a shift between an actual movement position and an ideal position of a machine bench to occur due to errors. Therefore, a test of hot running is required for acquiring data of the shift.

The current test method for hot running is combining a standard rod with the main shaft of the machine tool, and providing a dial gauge on a platform. Firstly, the measuring personnel moves a machine bench to allow the dial gauge to be pressed against the standard rod, and then the dial gauge is returned to zero and a current coordinate position is recorded. Subsequently, various shafts of a transmission device of the machine bench are allowed to move continuously in a reciprocated manner for a period of time, and then moved back to the coordinate position initially recorded. At this moment, the dial gauge touches the standard rod located on the main shaft, and if there are any error in the machine bench resulted from deformations and positioning due to temperature variations, the error is reflected on the dial gauge, and the measuring personnel records the value variations read by the dial gauge.

SUMMARY OF THE INVENTION

Since shifts in a transmission device of a current machine tool read during hot running is measured manually, issues of time-consuming and labor-consuming data recording is prevalent. Other issues such as recording cannot be done over a long time, frequent errors in reading, one dial gauge can only be used to read a single shaft and poor precision are also present. Accordingly, the present invention measures a shift of a main shaft in an optical and non-contact manner, and provides data recording for compensation in an electronic mode, solving the issues of time-consuming and imprecise recording.

To achieve said invention aims, the present invention provides a drive system thermal temperature rise test and compensation system, which is mounted on a machine tool, the machine tool has a transmission device and uses the transmission device to drive a platform, a main shaft cooperated with the platform is provided thereon, further comprising:

a sensing head provided with a base, wherein the base has an arbor and the arbor is used for combination with the main shaft, a bracket is provided on the base, an optical non-contact type sensor group is surroundingly provided on the bracket, and a sensing center is formed in the center of the sensor group;

plural ball lens devices respectively having a fixed seat, wherein the plural fixed seats are intervally fixed on the platform, an extension rod is combined with each of the fixed seats, and a ball lens is provided on a free end of each of the extension rods;

more than one temperature sensors respectively combined with the transmission device of the machine tool, wherein each of the temperature sensors are used to measure temperature and transmit temperature data externally; and a signal processor for receiving the temperature data measured by each of the temperature sensors, wherein the signal processor is signally connected to the sensing head, after the machine tool drives the sensing head, by means of the transmission device, to sequentially record an original point coordinate for a center of each of the ball lens, the transmission device operates to enable the sensing head to cyclically and sequentially move to the original point coordinate of each of the ball lenses, so as to record a displacement error between the sensing center and the center of the ball lens in each position of the original point coordinate sensed by the sensing head, along with the temperature data of each of the temperature sensors in the signal processor and use same for compensation.

By using the system described above, the present invention can be used to quickly measure a displacement error resulted from heat generated during operation of the transmission device over a long time, which does not require manual reading, can provide accurate and highly precise recorded data by automatically recording errors, and the system having one measurement apparatus can be used to perform measurements of multiaxial errors, as well as measurements of various axial temperatures of the transmission device, thereby further providing subsequent analysis on errors of the transmission device resulted from heat and satisfying a compensation requirement for corrections.

DETAILED DESCRIPTION OF THE PREFERRED EMBODIMENTS

To facilitate better understanding of the technical features and practical effects of the present invention, which may be implemented according to the content of the description, the preferred embodiments as shown in the figures are used for detailed description as follows.

Figure 1:
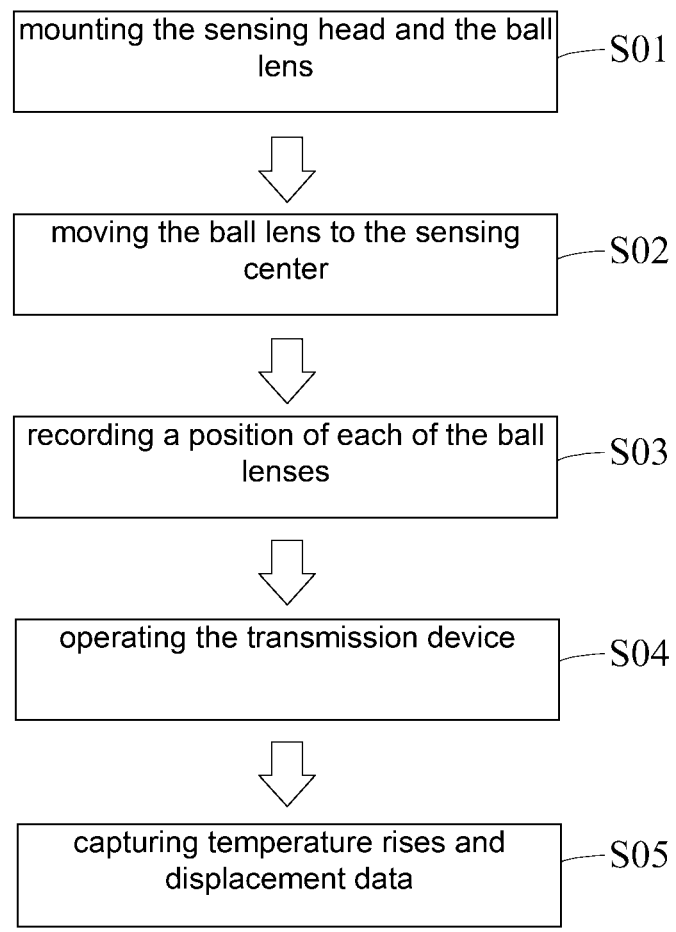
FIG. 1 is a step flow chart for performing a test and compensation method according to a preferred embodiment of the present invention.

According to the preferred embodiments as shown in FIGS. 1 to 4, the present invention provides a drive system thermal temperature rise test and compensation system 100, applicable to performing the test and compensation method indicated in FIG. 1. The drive system thermal temperature rise test and compensation system 100 is mounted on a machine tool 10 and comprises a sensing head 20, plural ball lens devices plural temperature sensors 40 and one signal processor 50, wherein:

in the present preferred embodiment, the machine tool 10 is a machine tool including an X-axis, a Y-axis and a Z-axis. However, in the other preferred embodiments, the machine tool may also be other types of multiaxial machine tool, for instance, a five-axis machine tool having an X-axis, a Y-axis, a Z-axis, an A-axis and a C-axis. The machine tool 10 has a transmission device A, the transmission device A includes a first transmission structure 11, a second transmission structure 12 and a third transmission structure 13 respectively corresponding to the X-axis, the Y-axis and the Z-axis. The first transmission structure 11 has a platform 111 which can move along the X-axis direction, the third transmission structure 13 includes an upright column 131, a cutter head 132 is combined with a front surface of the upright column 131 and can move along the Z-axis, the cutter head 132 is located directly above the platform 111, a main shaft 133 is provided on the cutter head 132, and the machine tool 10 is further provided with a controller 14 for digitally controlling actions of the transmission device A.

The sensing head 20 is provided with a base 21, the base 21 has an arbor 211 and the sensing head is combined with a bottom end of the main shaft 133 by means of the arbor 211, a bracket 22 is surroundingly provided on the base 21, and an optical non-contact type sensor group 23 is surroundingly provided in a position as high as the bracket 22. The sensor group 23 has a first laser head 231 and a first light spot displacement sensor 233 provided on two opposite sides of the bracket 22 corresponding to the X-axis direction, and a second laser head 232 and a second light spot displacement sensor 234 provided on two opposite sides of the bracket 22 corresponding to the Y-axis direction. A sensing center B is formed in a crossing point between a virtual connection of the first laser head 231 and the first light spot displacement sensor 233 and a virtual connection of the second laser head 232 and the second light spot displacement sensor 234, and the sensing center B is located in the center of the sensor group 23.

In the present preferred embodiment, four ball lens devices 30 are arranged in four positions in a matrix on a top surface of the platform 111, each of the ball lens devices 30 is respectively provided with a fixed seat 31. In the present preferred embodiment, each of the fixed seats 31 is a magnetic seat magnetically attached and fixed to the top surface of the platform 111. In the other preferred embodiments, each of the fixed seats 31 may also be intervally fixed to the platform 111 by means of locking, and a quantity of the ball lens device 30 may also be more than plural of them. An upwardly extended extension rod 32 is combined with each of the fixed seats 31, and a ball lens 33 is provided on a free end of each of the extension rods 32.

Figure 2:
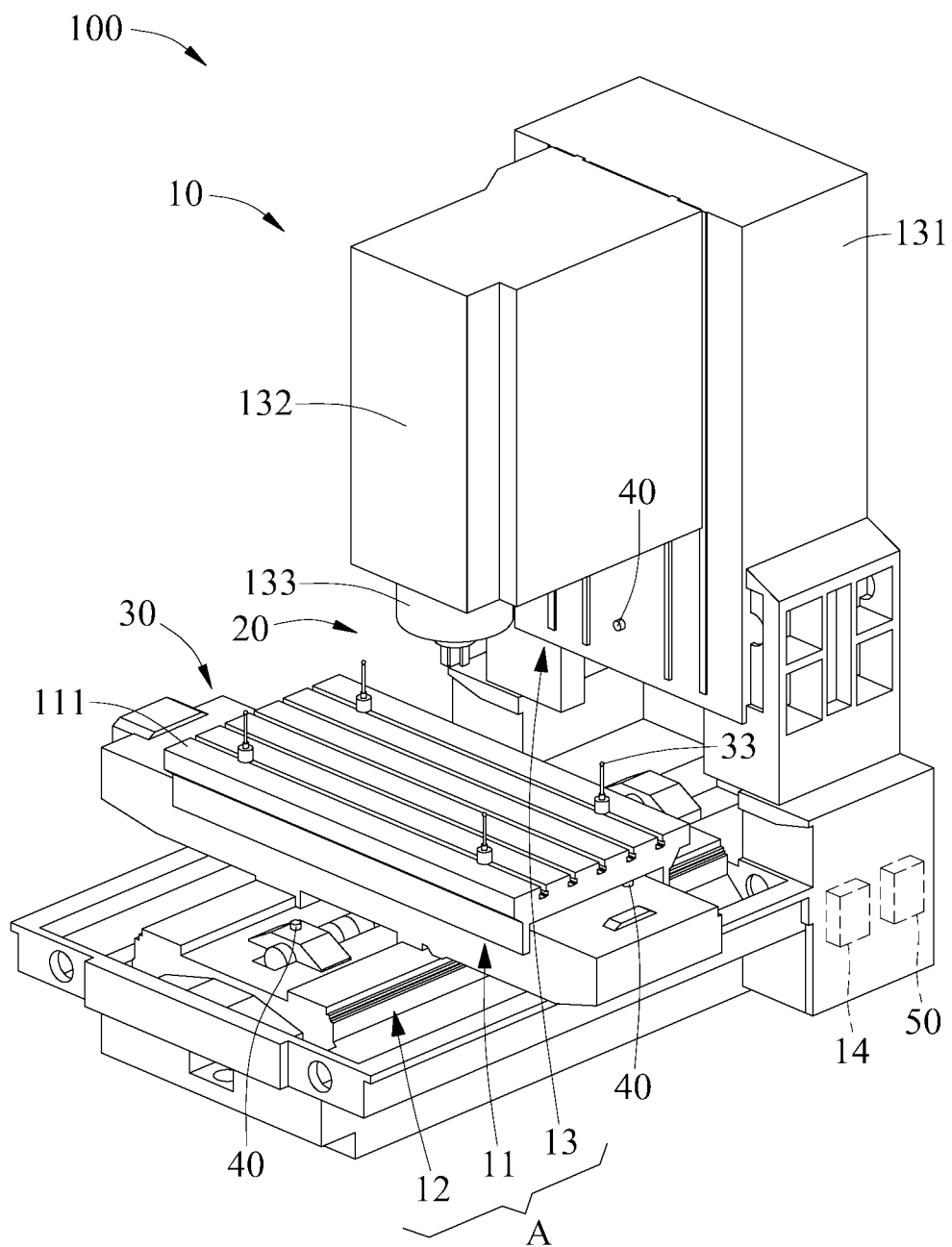
FIG. 2 is a stereoscopic view showing a preferred embodiment of the present invention mounted on a machine tool.
Figure 3:
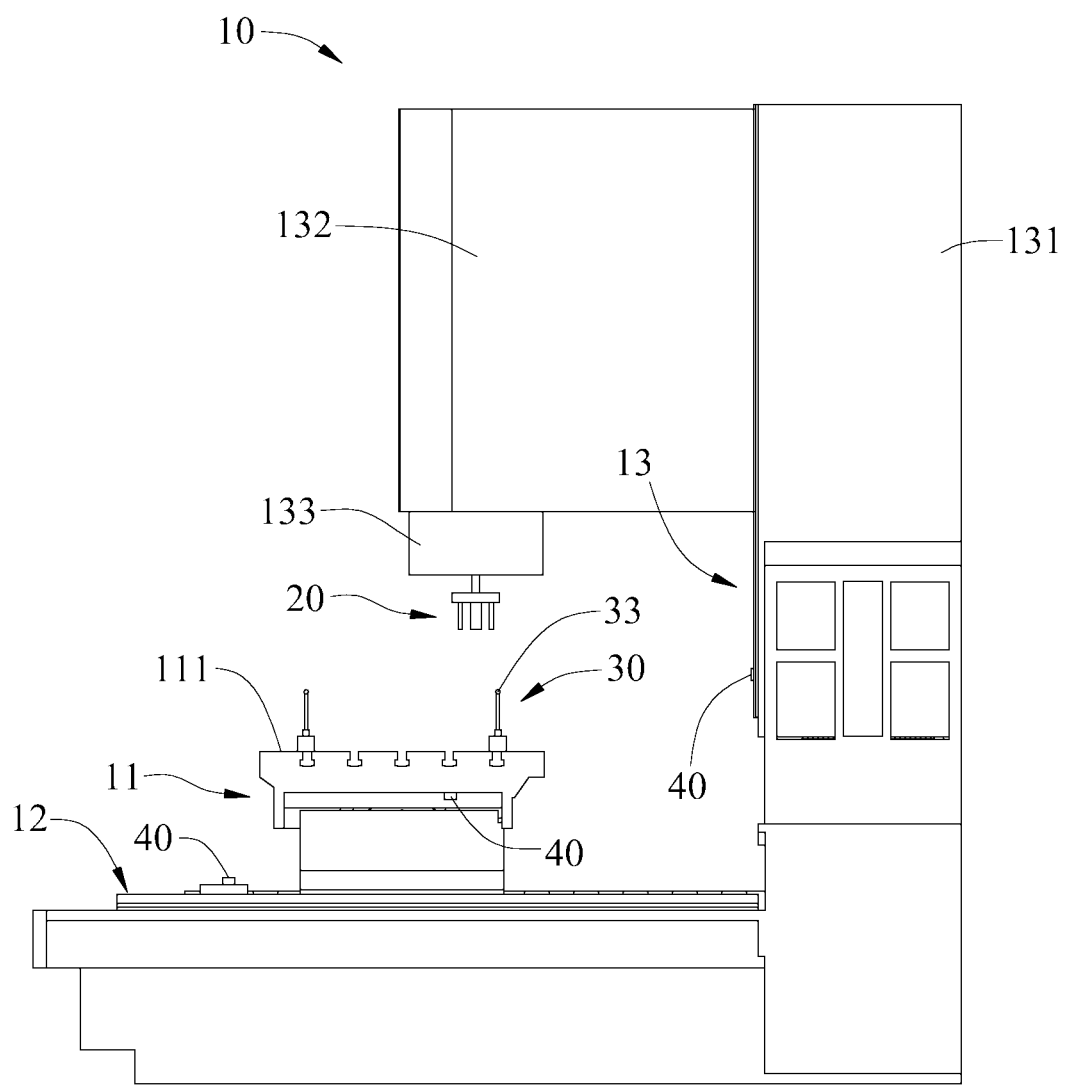
FIG. 3 is a right perspective view showing a preferred embodiment of the present invention mounted on a machine tool.
Figure 4:
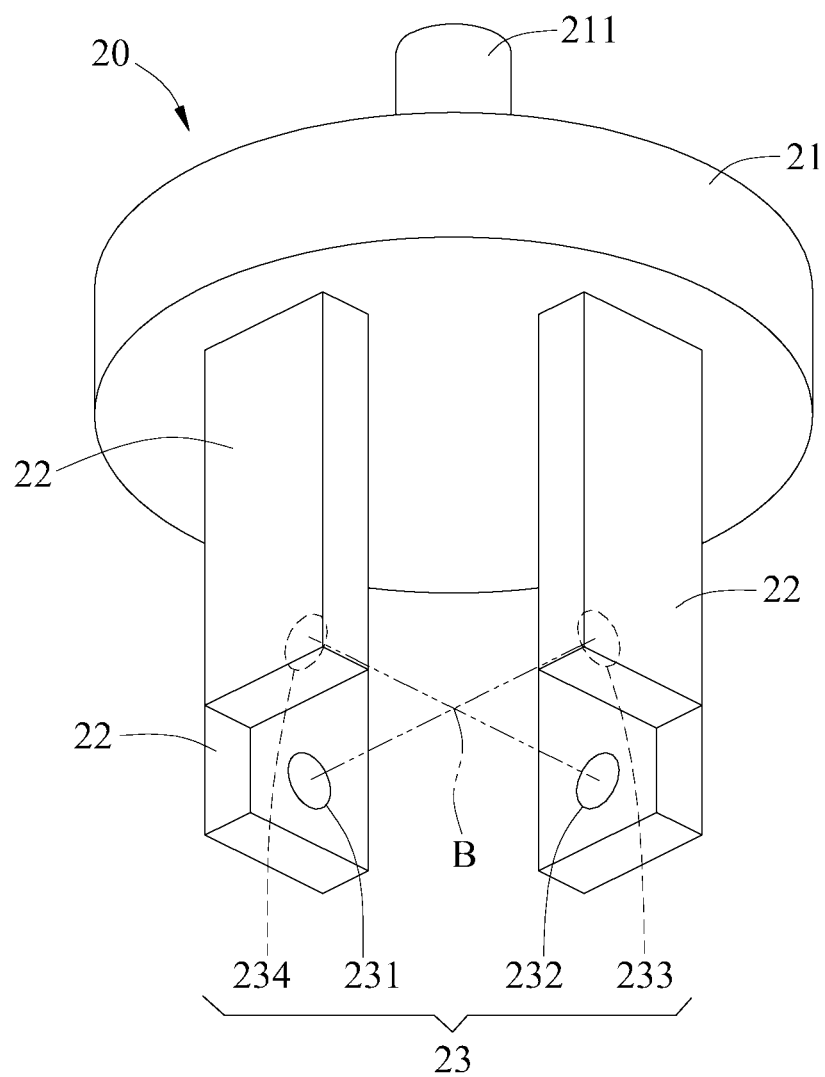
FIG. 4 is a bottom stereoscopic view showing a sensing head according to a preferred embodiment of the present invention.
Figure 5:
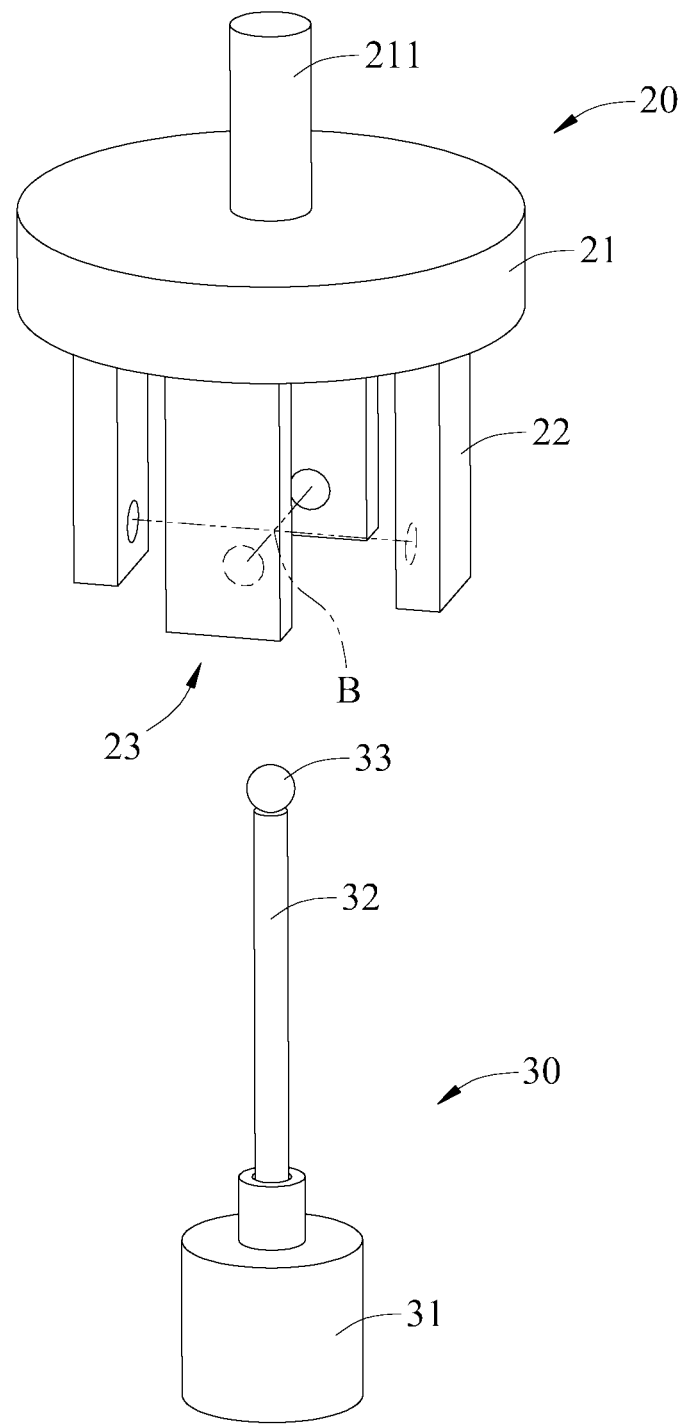
FIG. 5 is a stereoscopic view showing a sensor cooperated with one of the ball lens devices according to a preferred embodiment of the present invention.
Figure 6:
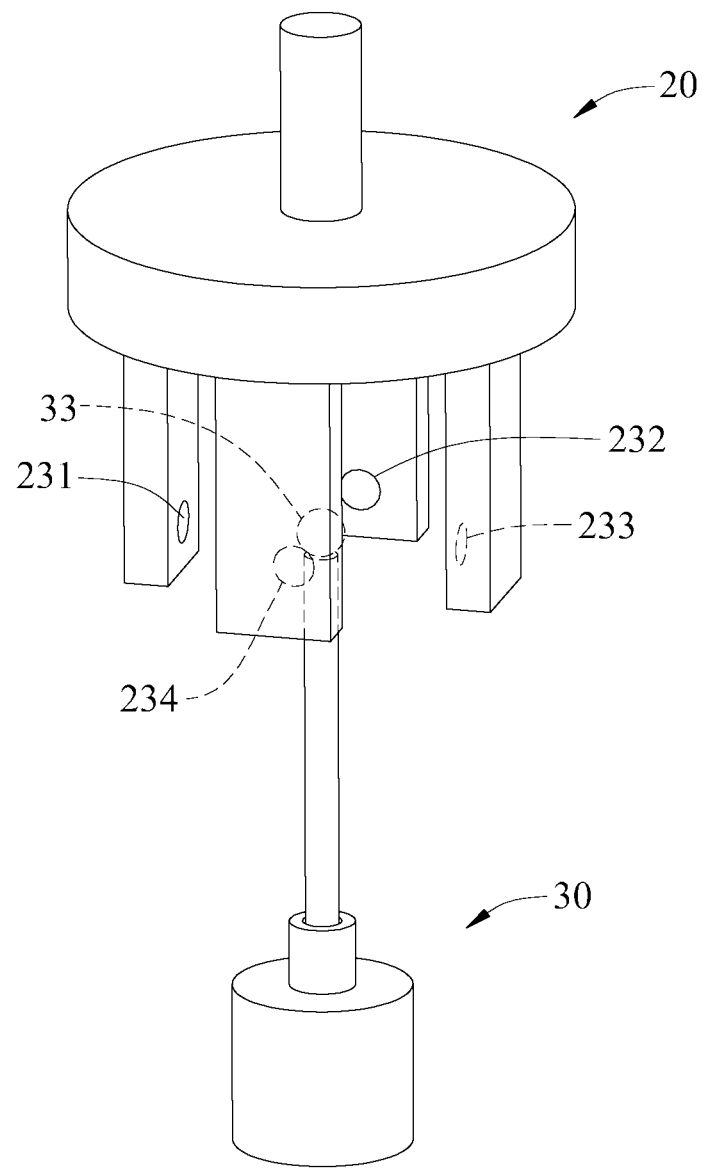
FIG. 6 is a schematic view showing a sensor reading an original point coordinate of one of the ball lenses according to a preferred embodiment of the present invention.
Figure 7:
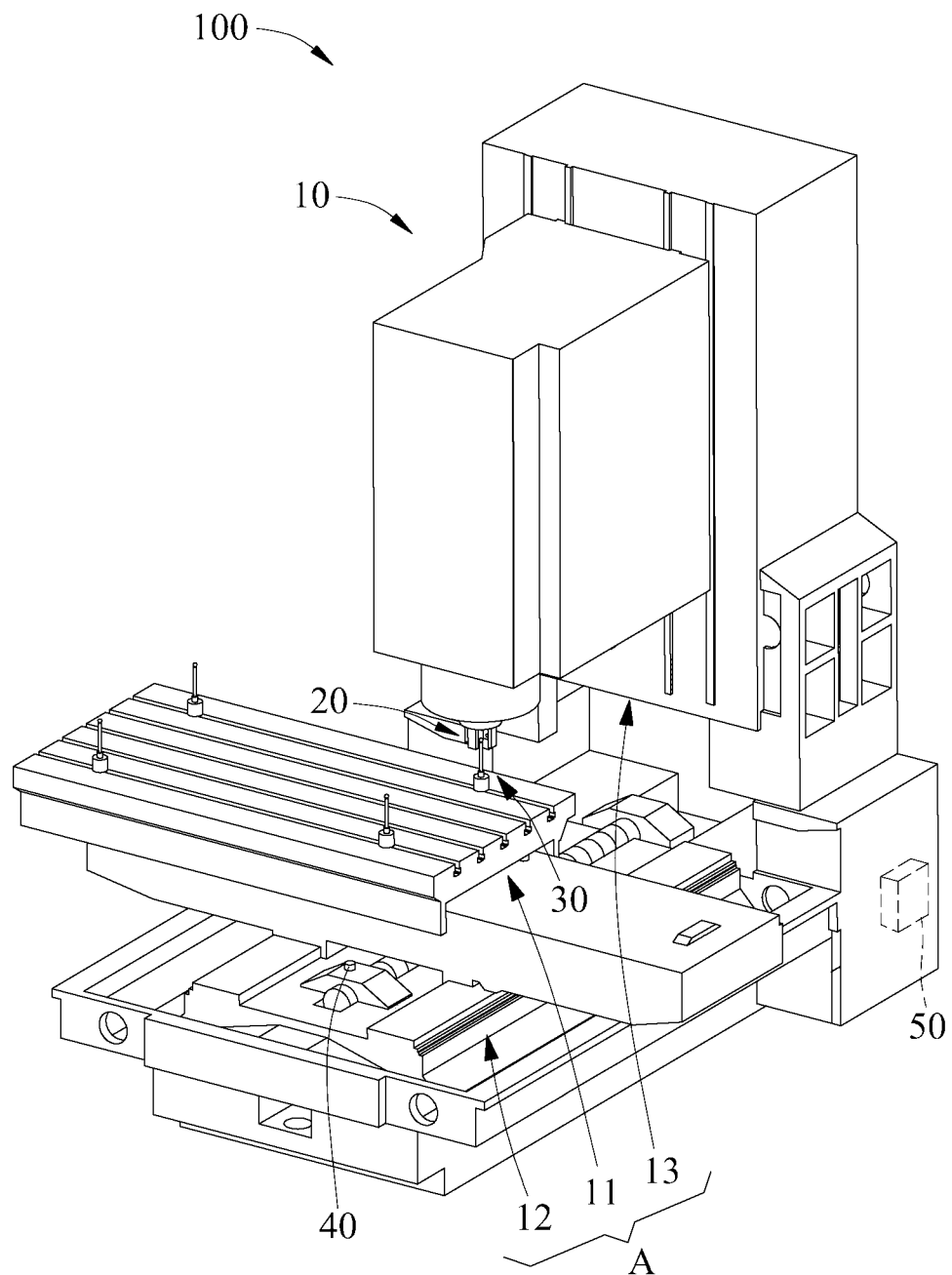
FIG. 7 is a schematic view showing a sensor moving to an original point coordinate of one of the ball lenses according to a preferred embodiment of the present invention.
Figure 8:
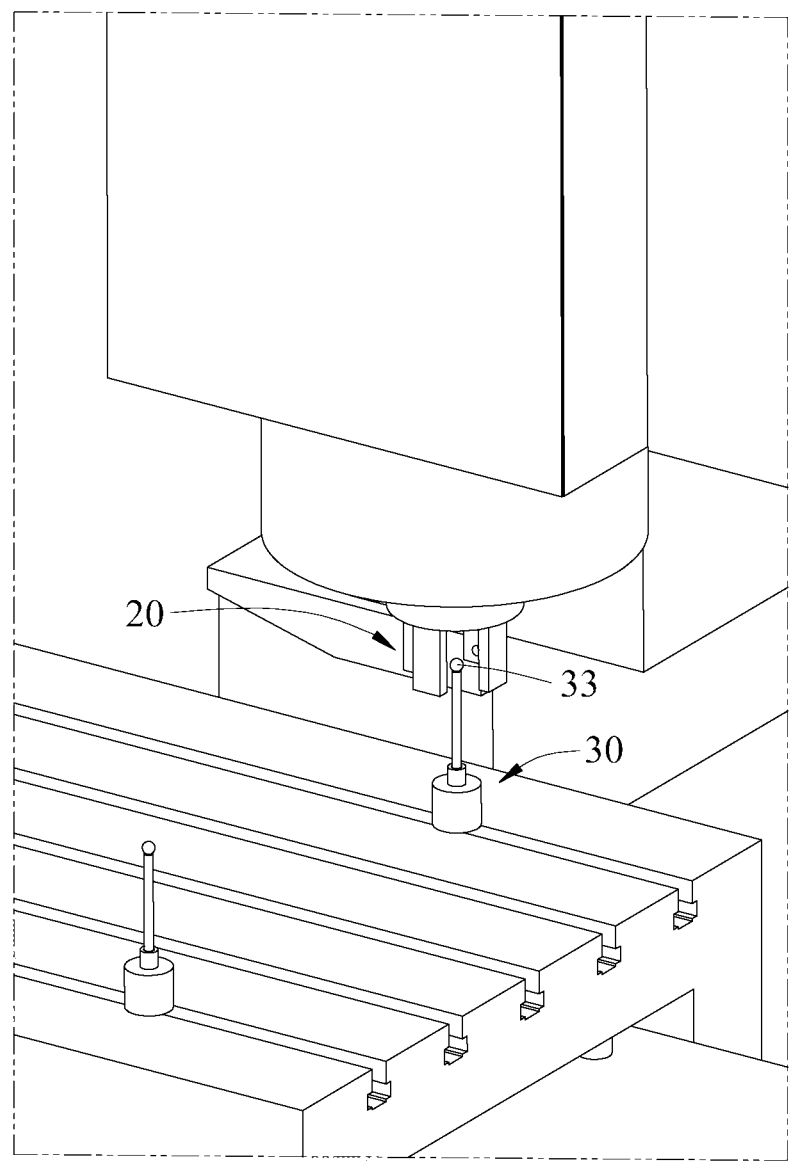
FIG. 8 is a partial zoomed-in view showing FIG. 7 according to a preferred embodiment of the present invention.
Figure 9:
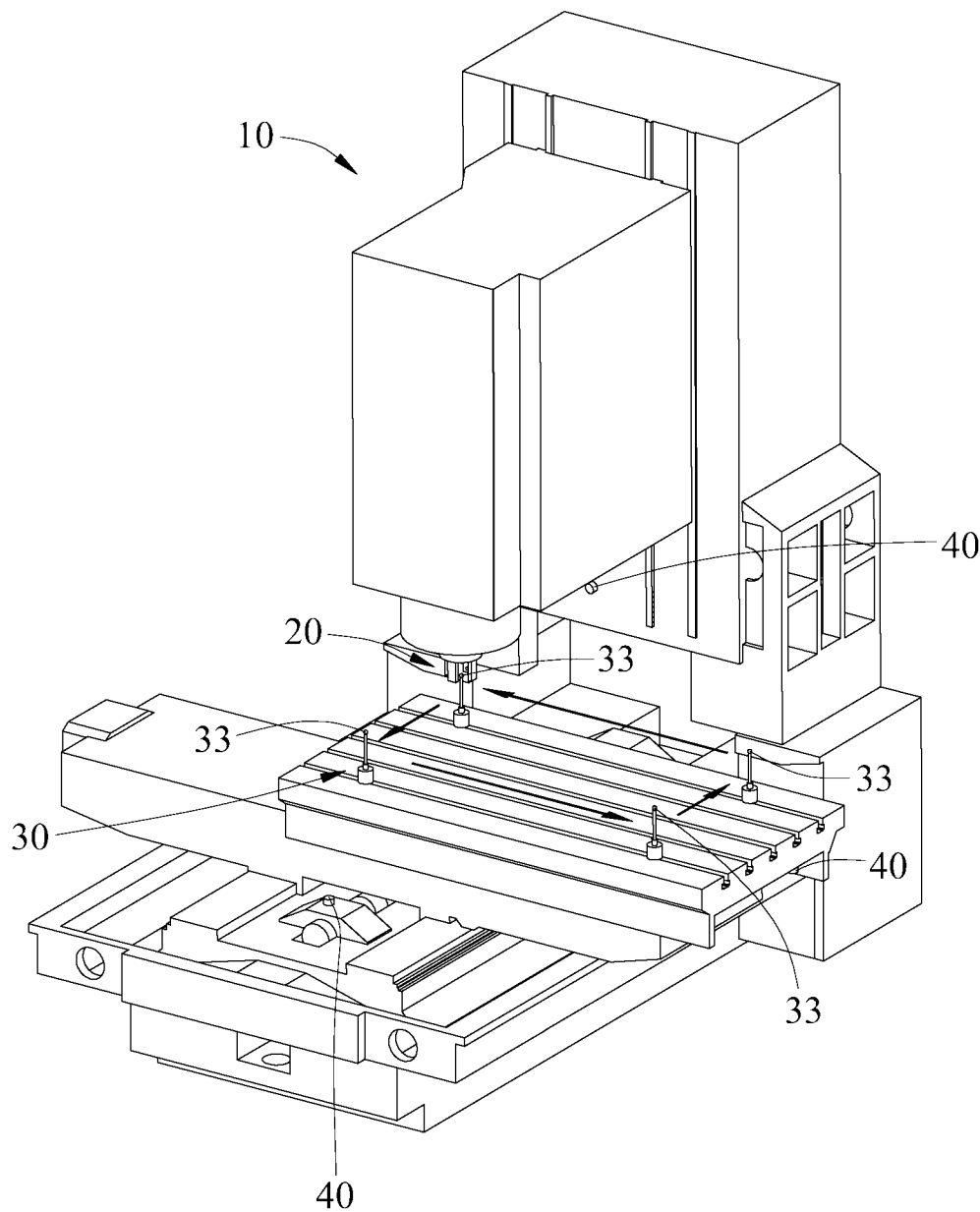
FIG. 9 is a schematic view showing a sensor sequentially moving to an original point coordinate of the next ball lens according to a preferred embodiment of the present invention.

Refer to FIGS. 2, 5 and 6, when the transmission device A of the machine tool 10 moves the sensing head 20, so as to enable the sensing head 20 to move and to initially enable the center of any of the ball lens 33 therein to be located in the sensing center B, laser lights emitted respectively from the first laser head 231 and the second laser head 232 which are passing through the center of the ball lens 33 will pass through the center of the ball lens 33 and move towards the centers of the first light spot displacement sensor 233 and the second light spot displacement sensor 234, and then the sensor group 23 can know that the center of the ball lens 33 is located in the sensing center B, and record an original point coordinate of the center of the ball lens 33.

Subsequently, when a structural shift resulted from heat occurs in the transmission device A due to a high temperature generated during operations of the transmission device A of the machine tool 10, the sensing head 20 is moved to the original point coordinate of the same ball lens 33. At this moment, the sensing center B is no longer overlapping with the center of the ball lens 33 due to the shift resulted from heat, the laser lights respectively emitted from the fist laser head 231 and the second laser head 232 will no longer pass through the center of the ball lens 33, and are therefore refracted to positions other than the centers of the first light spot displacement sensor 233 and the second light spot displacement sensor 234, such that the first light spot displacement sensor 233 and the second light spot displacement sensor 234 can respectively detect deviations of the two beams of laser light, thereby calculating a displacement error between the sensing center B and the center of the ball lens 33 by sensing a degree of deviation for each beam of laser light.

In the present preferred embodiment, a quantity of plural temperature sensors 40 corresponds to an axial quantity of the machine tool 10. For instance, in the present preferred embodiment, three temperature sensors are provided correspondingly to the X-axis, the Y-axis and the Z-axis. But in the other embodiments, a temperature sensor 40 may be combined with one of the axes of the transmission device A, or one temperature sensor 40 may be combined in a position of more than two axes, or multiple temperature sensors 40 may be provided in each of the axes. Each of the temperature sensors 40 is respectively a device used to sense temperature and transmit temperature data externally, and is a structure which can be correspondingly fixed to each axis of the transmission device A in a magnetic attachment or binding mode. For instance, in the present preferred embodiment, the three temperature sensors 40 are respectively combined with the first transmission structure 11, the second transmission structure 12 and the third transmission structure 13 in a magnetic attachment mode. By using the three temperature sensors 40, temperatures of the first transmission structure 11, the second transmission structure 12 and the third transmission structure 13 can be sensed in real time, and then signals of temperature can be transmitted externally in a wired or wireless manner. In the other preferred embodiments, the temperature sensors 40 provided on the first transmission structure 11, the second transmission structure 12 and the third transmission structure 13 are not limited to one, and multiple temperature sensors 40 can be provided for increasing temperature data measuring the transmission structure in each axis.

The signal processor 50 can be provided on the machine tool 10 or detachably provided in an external portion of the machine tool 10, in the present preferred embodiment, the signal processor 50 is provided on the machine tool 10. The signal processor 50 is signally connected to each of the temperature sensors 40 in a wired or wireless manner, and used to receive temperature information measured by each of the temperature sensors 40. The signal processor 50 is signally connected to the sensing head 20 in a wired or wireless manner, and used to receive the displacement error between the sensing center B and the center of the ball lens 33 when the sensing center B is moved to the original point coordinate of the center of each of the ball lenses 33, and then record the displacement error and the temperature data of each of the temperature sensors at that moment.

When the above-mentioned drive system thermal temperature rise test and compensation system 100 of the present invention is used to perform the test and compensation method indicated in FIG. 1, refer to FIGS. 2 and 7 to 9, the following steps are performed:

(S01) mounting the sensing head and the ball lens: mounting the sensing head 20 on the main shaft 133, respectively mounting the three temperature sensors 40 on the three axes of the transmission device A including the first transmission structure 11, the second transmission structure 12 and the third transmission structure 13, and mounting the four ball lens devices 30 on the platform 111.

(S02) moving the ball lens to the sensing center: the controller 14 controlling the machine tool 10 to drive the sensing head 20, mounted on the main shaft 133, to move by using the transmission device A, sequentially lowering same above each of the ball lens devices 30, so as to enable each of the ball lenses 33 to enter the sensing center B of a zero point/an original point of the sensing head 20.

(S03) recording a position of each of the ball lenses: when each of the ball lenses 33 enters into the sensing center B of the zero point/original point of the sensing head 20, recording the original point coordinate of the ball lens 33 overlapping with a position of the sensing center B, subsequently, moving the sensing head 20 upwards to a position of the next ball lens 33 and repeating the steps of the above-mentioned S02 and S03, sequentially moving the remaining three ball lenses 33 to the sensing center B of the sensing head 20, and recording the position of the original point coordinate for each of the ball lenses 33.

(S04) operating the transmission device: according to the above-mentioned order of measuring the original point coordinate of each of the ball lenses 33, cyclically and sequentially using the transmission device A to drive each of the ball lenses 33 to move, so as to enable the sensing head 20 to move to the position of each original point coordinate previously recorded.

(S05) capturing temperature rises and displacement data: when the sensing head 20 is moved to the position of the original point coordinate previously recorded, software installed in the signal processor 50 automatically recording a current displacement error and a temperature measured by the temperature sensor 40 corresponding to each axis. Repeating the above-mentioned steps of S04 and S05, continuously measuring and recording the displacement errors and temperatures of the ball lens devices 30 in the four positions which are increased along with operations of the transmission device A over time, thereby completing the thermal temperature rise test of the transmission device A and using same for compensation.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A drive system thermal temperature rise test and compensation system mounted on a machine tool, wherein the machine tool has a transmission device and the transmission device is used to drive a platform, a main shaft cooperated with the platform is provided thereon, further comprising:

a sensing head provided with a base, wherein the base has an arbor and the arbor is used for combination with the main shaft, a bracket is provided on the base, an optical non-contact type sensor group is surroundingly provided on the bracket, and a sensing center is formed in the center of the sensor group;

plural ball lens devices respectively having a fixed seat, wherein the plural fixed seats are intervally fixed on the platform, an extension rod is combined with each of the fixed seats, and a ball lens is provided on a free end of each of the extension rods;

more than one temperature sensors respectively combined with the transmission device of the machine tool, wherein each of the temperature sensors are used to measure temperature and transmit temperature data externally; and a signal processor signally connected to the sensing head and used for receiving the temperature data measured by each of the temperature sensors, wherein after the machine tool drives the sensing head, by means of the transmission device, to sequentially record an original point coordinate for a center of each of the ball lens, the transmission device operates to enable the sensing head to cyclically and sequentially move to the original point coordinate of each of the ball lenses, so as to record a displacement error between the sensing center and the center of the ball lens in each position of the original point coordinate sensed by the sensing head, along with the temperature data of each of the temperature sensors in the signal processor and use same for compensation.

2. The drive system thermal temperature rise test and compensation system according to claim 1, wherein the machine tool is a multiaxial machine tool, the transmission device has a multiaxial transmission structure, a plurality of the temperature sensors are provided, and more than one temperature sensors are combined with a transmission structure of each axis.

3. The drive system thermal temperature rise test and compensation system according to claim 2, wherein the machine tool is a machine tool including an X-axis, a Y-axis and a Z-axis, the transmission device includes a first transmission structure, a second transmission structure and a third transmission structure respectively corresponding to the X-axis, the Y-axis and the Z-axis, three of the temperature sensors are provided and respectively combined with the first transmission structure, the second transmission structure and the third transmission structure.

4. The drive system thermal temperature rise test and compensation system according to claim 1, wherein four ball lens devices are provided, and the four ball lens devices are fixed to a top surface of the platform in an arrangement of a matrix.

5. The drive system thermal temperature rise test and compensation system according to claim 2, wherein four ball lens devices are provided, and the four ball lens devices are fixed to a top surface of the platform in an arrangement of a matrix.

6. The drive system thermal temperature rise test and compensation system according to claim 3, wherein four ball lens devices are provided, and the four ball lens devices are fixed to a top surface of the platform in an arrangement of a matrix.

7. The drive system thermal temperature rise test and compensation system according to claim 4, wherein each of the fixed seats is a magnetic seat, and each of the fixed seats is magnetically attached and fixed to the top surface of the platform.

\* \* \* \* \*